United States Patent [19]

O'Brien et al.

[11] Patent Number: 4,598,493
[45] Date of Patent: Jul. 8, 1986

[54] RETRIEVING DEVICE FOR SNAGGED FISHING APPARATUS

[76] Inventors: William O'Brien, 1710 Coventry Rd., Joliet, Ill. 60432; Kevin Pozulp, R.R. #1, Box #177, Lockport, Ill. 60441

[21] Appl. No.: 547,843

[22] Filed: Nov. 2, 1983

[51] Int. Cl.$^4$ .............................................. A01K 91/00
[52] U.S. Cl. ...................... 43/17.2; 43/44.9; 24/573
[58] Field of Search ............ 43/17.2, 44.9; 24/573, 24/625, 627

[56] References Cited

U.S. PATENT DOCUMENTS

| | | | |
|---|---|---|---|
| 2,729,015 | 1/1956 | Finnegan | 43/44.9 |
| 2,809,460 | 10/1957 | Taylor | 43/17.2 |
| 3,224,132 | 12/1965 | Frantz | 43/44.9 |
| 3,628,279 | 12/1971 | Halone | 43/44.9 |
| 3,803,749 | 4/1974 | Boyum | 43/44.9 |

Primary Examiner—Nicholas P. Godici
Assistant Examiner—C. McKee
Attorney, Agent, or Firm—Hill, Van Santen, Steadman & Simpson

[57] ABSTRACT

A retrieving device for a snagged fishing apparatus such as lures and hooks wherein a weighted body is self-guided along a snagged line as it is lowered by a retrieving line connected to the retrieving device. When the retrieving device contacts the end of the snagged line, it either jars the hook or lure free from the snag, or flexible chains suspended from the weighted body engage in the vicinity of the snag as the main body is jostled. By engagement of one or more hooks through apertures in at least one of the chains, the hook or lure is unsnagged as the retrieving line pulls on the retrieving device.

15 Claims, 5 Drawing Figures

RETRIEVING DEVICE FOR SNAGGED FISHING APPARATUS

BACKGROUND OF THE INVENTION

The invention relates to a retrieving device for retrieving snagged fishing apparatus such as lures or hooks which become entangled with structures beneath the surface of the water in which a fishing activity is occurring.

Frequently when fishing, one's fishing line can snag on a bottom structure such as a branch of a fallen tree. This particularly occurs when fishing with lures when they are retrieved along a path close to the bottom of the fishing location. When such a snag occurs, frequently as the fisherman is attempting to unsnag the lure, the fishing line attached to the lure will snap. The fisherman must then obtain an alternate lure from his tackle box, must replace the leader and/or other attachment device employed between the line and the lure, and, if he desires to replace the lost lure, must make a special trip to a fishing store for replacement thereof. Thus, not only must the fisherman frequently purchase a new lure but he is also put to considerable inconvenience when the fishing line breaks and the lure is lost. If the fisherman had used the same lure for many years with great success, he may feel compelled to repurchase the same lure style or design. It is possible, however, that such a style or design is no longer readily obtainable. Thus, the fisherman may be seriously inconvenienced in searching for a substitute, or may never find a desirable substitute.

SUMMARY OF THE INVENTION

It is, then, an object of the invention to provide a retrieving device for snagged fishing apparatus which will prevent the loss of the lure or other attached fishing apparatus when a snag occurs.

It is a further object of the invention to provide a retrieving device which, when used, will allow a high percentage of successful retrievals.

It is another object of the invention to provide a retrieving device which can successfully retrieve snagged fishing apparatus at relatively low cost to the fisherman.

It is a further object of the invention to provide a retrieving device for snagged fishing apparatus which will be of low cost construction, yet of a sufficiently high quality, to last for many years in a relatively corrosive environment associated with fishing.

According to the invention, a retrieving device is provided for unsnagging a snagged fishing line wherein a weighted body is provided with means for tracking the body automatically along the snagged fishing line so that the weighted body, as it is lowered by a retrieval line, will strike the snagged lure or hook so as to jostle the same free from a snagged condition. If the jarring action is unsuccessful, since the weighted body is also provided with flexible chains or the like having a plurality of chain-link apertures, when the weighted body is jostled upwardly or downwardly by the fisherman via the retrieval line, hooks attached to the snagged line or hooks of the fishing lure engage through one or more of the apertures in the chains. When the fisherman detects that the retrieval device has successfully engaged a hook, he then pulls on the retrieving line to free the snagged line and retrieve the same to the surface.

DESCRIPTION OF THE PREFERRED EMBODIMENTS

Figure 1:
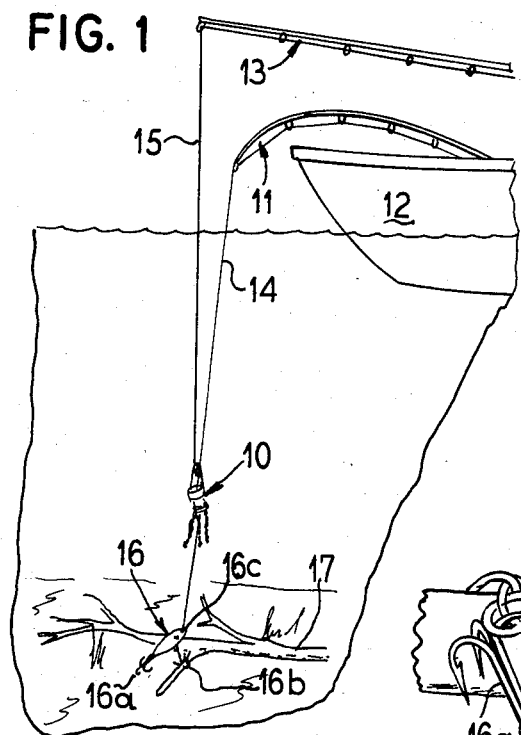
FIG. 1 is a perspective view of a snagged fishing line and shows the retrieving device according to the invention being lowered along the snagged line toward the snagged lure.

FIG. 1 illustrates one of the principal uses of the retrieving device according to the invention by showing a snagged fishing line 14 connected to a fishing pole 13 being employed by a fisherman in a fishing boat 12. The snagged line 14 is attached to a fishing lure 16 or the like which has become snagged on a portion of a branch 17 or the like beneath the surface of the water in which the fisherman was fishing. Of course, the invention is also applicable to a numerous variety of different snagging conditions other than branches, such as weeds or other bottom structures. Also, the invention is applicable to fishing apparatus other than lures such as hooks or the like attached to the fishing line 14.

When the snag has occurred, preferably the fisherman will position the boat 12 substantially directly over the snag. He will then attach the retrieving device 10 according to the invention so that it may be guided down and along the snagged line 14 as it is lowered by a retrieving line 15 attached to the retrieving device 10. The retrieving line 15 is preferably controlled by a retrieving pole 13, although of course it may not be necessary to have a retrieving pole 11 since the retrieving line 15 could be lowered by hand, among other means.

The retrieving line 15 will preferably be capable of handling at least a 25-pound load and is preferably 100-pound test line. The retrieving line should be flexible and may comprise a variety of lines currently available on the market or even may constitute wire.

Figure 2:
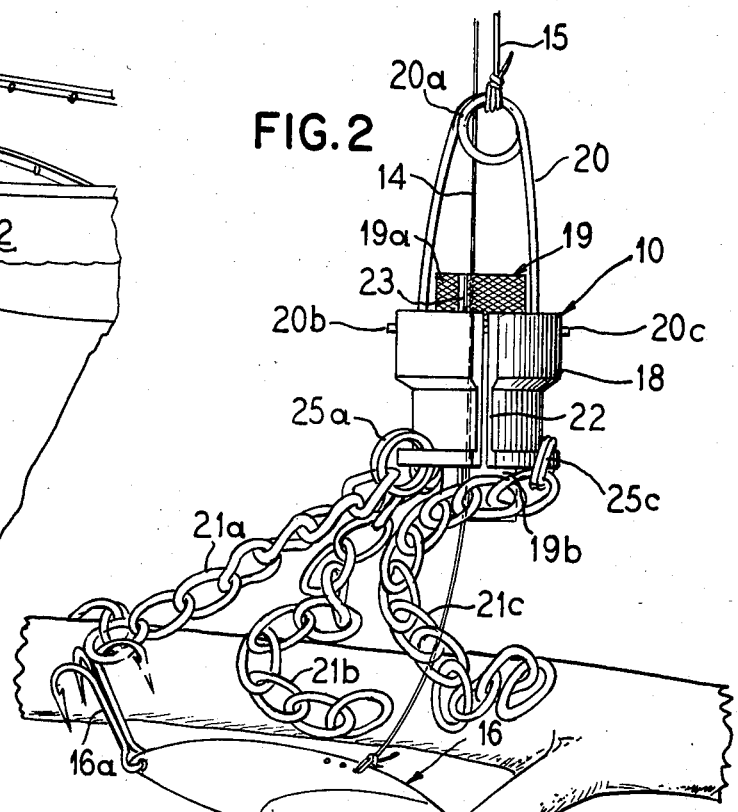
FIG. 2 is a side view of the retrieving device according to the invention.

As shown in FIG. 1, it is assumed that for the preferred embodiment shown, the lure 16 comprises a lure body 16c and treble hooks 16a and 16b. As shown in FIG. 2, when the retrieving device 10 is lowered to the vicinity of the snag, it may contact the lure 16 and knock it free from the snagged condition. In most cases, however, the jarring action of the weighted body may not be sufficient to release the snagged lure. In this case, the fisherman jogs the retrieving device 10 in an up and down motion so that one or more chains 21a, 21b, 21c having apertures therein formed by each chain link can engage one or more of the treble hooks. In FIG. 2, the chain 21a engages a treble hook 16a. It is, of course, understood that either more or less than three chains may be employed, although in the preferred embodiment, at least three chains are utilized. The chains should be flexible, have numerous apertures of an appropriate size for engagement of the treble hooks, and have a preferred length of four inches. It has been found that the length of the chains may vary between three to five inches in the preferred embodiment. Of course, other chain-like or similar suspended hook engaging systems may also be employed.

The preferred weight of the entire unit is five ounces with a preferred range of four to six ounces. Depending upon the application, it is also possible to design the retrieving device in a weight range of three to seven ounces.

The bulk of the weight is provided by a main body 18 preferably constructed of brass or the like. The chains 21a, b, c, thus are suspended from the main body 18 so that the retrieving device assumes a "squid-like" appearance.

A nylon press fit insert 19 is provided in a central aperture 18g of the main body 18. The insert, of course, could be constructed of other equally suitable materials having characteristics similar to nylon.

Figure 3:
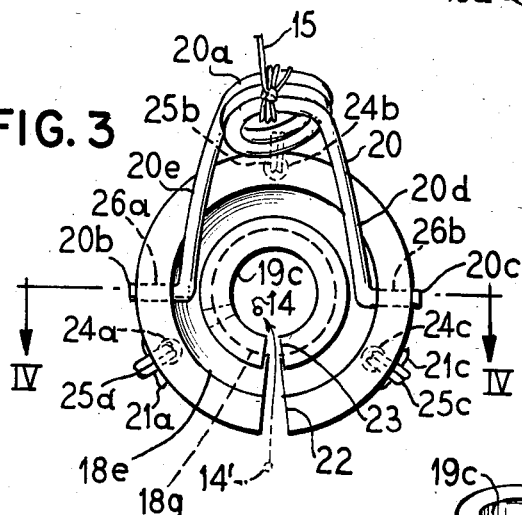
FIG. 3 is a top view of the device shown in FIG. 2.

The nylon insert 19 preferably has a V-shaped groove forming a slit 23 which, in combination with the design of the exterior dimensions of the nylon insert 19, permits a press fit within the aperture 18g. The main body 18 also has a V-shaped groove forming a slit 22. As shown in FIG. 3, when the two V-shaped grooved slits 22 and 23 are aligned by rotating the nylon insert, a fishing line 14' previously exterior to the retrieving device may be slipped into a central aperture 19c of the insert. Thereafter, the fisherman twists the insert relative to the main body so that the V-shaped grooved slits are no longer aligned and the fishing line is freely retained within the aperture 19c so as to permit the retrieving device to automatically guide itself down the snagged fishing line 14.

Figure 5:
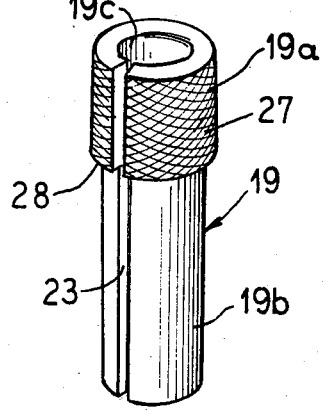
FIG. 5 is a perspective view of a central insert after removal from the main body of the retrieving device according to the invention.

As shown most clearly in FIG. 5, a head portion 19a of the insert 19 has a diameter greater than the central aperture 18g in the main body 18 so that shoulder 28 formed between the head portion 19a and a narrower elongated portion 19b may abut against a shoulder 18f of a counterbore 18e centrally of the main body 18 and in alignment with the aperture 18g. The narrower extending portion 19b, as shown most clearly in FIG. 4, extends beyond a bottom end of the main body 18. This extension permits the fisherman to push the insert to assist in removal of the insert from the main body. Also, knurling 27 is provided at the head portion 19a of the insert to assist the fisherman in twisting the insert in pulling or pushing it free from the press fit within the aperture 18g of the main body 18.

Figure 4:
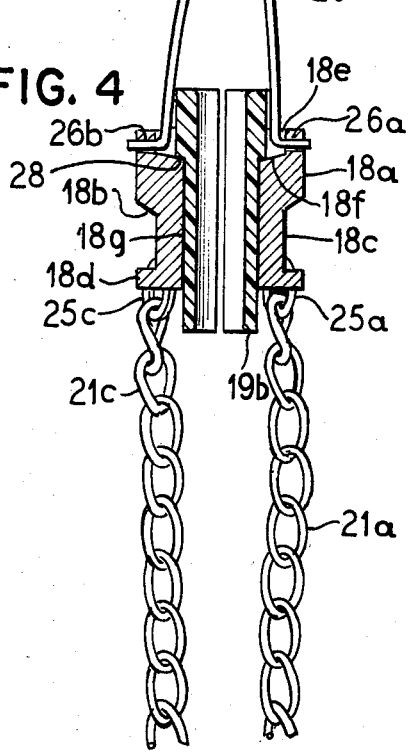
FIG. 4 is a cross-sectional view taken along line IV—IV of FIG. 3.

As shown most clearly in FIGS. 3 and 4, a stainless steel spring clip 20 of spring-like steel is employed to attach the retrieving line 15 to the main body 18. The clip 20 may be deflected from side to side since it is mounted via mounting portions 20b and 20c attached to legs 20d and 20e. The clip is preferably formed in a loop so as to form an attachment aperture 20a to which the retrieving line 15 is tied. Apertures 26a and 26b are provided as shown most clearly in FIG. 4 at the walls of the counterbore or depression 18e for receiving the mounting portions 20b, 20c of the clip 20. By squeezing the legs 20d and 20e toward one another, the clip can be released from the main body. Also, since the legs 20d and 20e of the clip 20 are aligned close to the insert 19, when the clip is in an upward position directly over the insert, the clip acts to partially lock the insert in place. When the clip is deflected to one side or the other, then the insert may be freely removed since the blocking action of the clip 20 is avoided.

As shown most clearly in FIGS. 3 and 4, the chains 21a, b, c are attached via attachment rings 25a, 25b, 25c engaged in apertures 24a, b, c in a lower lip 18d of the main body 18.

The main body 18 preferably has a circular horizontal cross section and has an upper wide portion 18a, a slanting transition portion 18b a narrowed portion 18c, and a lower lip portion 18d.

In a variation of the invention, rather than employing a press fit for the nylon insert, or in addition to the press fit action, a counterpin or the like may be provided to retain the insert in position.

The chains 21a, 21b, and 21c are preferably chrome plated for corrosion resistance. Although only three chains are employed, more or less than three chains may be used.

By providing the spring clip 20 with a design as shown, when the insert 19 is in position, the insert 19 also blocks removal of the spring clip since if the legs 20d, 20e of the clip 20 were inadvertently pinched inwardly, they would contact the outer peripheral portion of the head 19a of the insert 19 prior to release of the clip from the main body.

With the invention, the snagged fishing line may be loosened merely by the weight of the retrieving device as it strikes the snagged portion of the fishing apparatus. If this is unsuccessful, the chains will then engage one or more hooks and the lure, when pulled via the retrieving device and retrieving line, will either break loose from the snagged twig or the like, or the entire structure to which the lure or the like is snagged will be pulled to the surface. At times, the particular hook which is snagged may straighten due to the pulling action of the retrieving line 15 so that the snag is thus released. Once the lure or hook is returned to the surface, the hook may then be repaired by simply bending it back into position.

The retrieving device according to the invention has proved to be highly successful and is effective to retrieve snagged lures almost 100% of the time. The unit is relatively compact and may be easily contained within a fishing box. The main body has a preferred outside diameter such that the attached chains are separated by approximately one and one-eighth inches with a range of from three-quarter to two inches. The main body preferably has a length of one inch in a range from three-quarter into to one and one-half inches.

The weighted main body 18 is symmetrically designed and weighted so that as the main body tracks downwardly along the snagged line 14, its center of gravity will remain substantially over the lure 16 when it strikes it.

Although various minor modifications and changes might be proposed by those skilled in the art, it will be understood that we wish to include within the claims of the patent warranted hereon all such changes and modifications as reasonably come within our contribution to the art.

We claim as our invention:

1. A retrieving device for connection to a retrieving line for retrieving a snagged fishing lure connected to a snagged line, comprising:
    a weighted main body having a longitudinal aperture which receives an insert also having an aperture;
    both the main body and the insert each having a slit;
    the slit being positioned in the insert such that the slit may be aligned with the main body slit so as to permit the snagged line to be positioned from a location external to the retrieval device to an internal position within the aperture of the insert, and such that when a position of the insert is changed and the slits are not longer aligned, the snagged line will be retained within the insert aperture and the main body will guide itself downwardly along the snagged line;

attachment means for attaching the retrieving line to the main body;

a plurality of chains being suspended from a bottom portion of the main body and being positioned and dimensioned such that one or more apertures of the chains can engage hooks of the lure when the retrieval device is lowered to a vicinity of the snagged lure; and the attachment means comprising a spring clip having one end adapted for tying to the retrieving line and the other end having mounting portions freely received in mounting apertures of the main body, the mounting apertures, the clip, and the clip mounting portions being dimensioned and positioned so as to permit a deflected position of the clip so that in a first position the insert is substantially blocked from removal and in another position the clip can be swung clear to permit insert removal, and wherein with the insert received within the main body, the insert blocks disengagement of the clip mounting portions from said mounting apertures.

2. A retrieving device according to claim 1 wherein the main body has a circular cross-section, the insert has a circular cross-section, and the insert has outer dimensions creating a press-fit of the insert within the main body central aperture.

3. A retrieving device according to claim 2 wherein the insert has a head portion of a greater diameter than a narrower portion and a shoulder being formed at a transition point which provides a resting position for the insert when it is press-fit in the aperture of the main body.

4. A retrieving device according to claim 1 wherein at least three chains are provided which are equally spaced around a periphery of the main body and are attached at a lower portion thereof.

5. A retrieving device according to claim 4 wherein the chains have a length between three and five inches.

6. A retrieving device according to claim 1 wherein the device has an overall weight between three and seven ounces.

7. A retrieving device according to claim 6 wherein the retrieving device has a weight between four and six ounces.

8. A retrieving device according to claim 1 wherein the slits are V-shaped to assist in aligning and passing the snagged line through the slits into the aperture of the insert.

9. A retrieving device according to claim 1 wherein the insert comprises nylon and is dimensioned so as to be press-fit into the central aperture of the main body.

10. A retrieving device according to claim 1 wherein the main body has a circular horizontal cross-section and has a length extending along the central aperture of between three-quarter and one and one-half inches.

11. A retrieving device for connection to a retrieving line for retrieving a snagged fishing lure connected to a snagged line, comprising:

a weighted main body having a central aperture which receives an insert also having an aperture;

both the main body and the insert each having a slit;

the slit being positioned in the insert such that the slit may be aligned with the main body slit so as to permit the snagged line to be positioned from a location external to the retrieval device to an internal position within the aperture of the insert, and such that when a position of the insert is changed and the slits are no longer aligned, the snagged line will be retained within the insert aperture and the main body will guide itself downwardly along the snagged line;

attachment means for attaching the retrieving line to the main body;

a plurality of chains being suspended from a bottom portion of the main body and being positioned and dimensioned such that one or more apertures of the chains can engage hooks of the lure when the retrieval device is lowered to a vicinity of the snagged lure;

the attachment means comprising a spring clip having one end adapted for tying the retrieving line and the other end having mounting portions freely received in mounting apertures of the main body, the mounting apertures and the clip being dimensioned and positioned so as to permit a deflected position of the clip so that in a first position the insert is substantially blocked for removal and in another position the clip can be swung clear to permit insert removal; and the main body having a depression at an upper portion thereof, the mounting apertures for the clip being provided in a sidewall portion created by the depression, and the clip having spring-like legs which when pinched toward one another permit insertion of the clip mounting portions into the apertures and the spring-like legs bias the mounting portions outwardly unitl the legs contact the inner walls of the depression.

12. A retrieving device according to claim 1 wherein the insert has a circular cross-section with a head portion of greater diameter which creates a shoulder for abutting against a top portion of the main body when inserted, and said insert having a length from the head portion to its lower end which is longer than a length of the central aperture of the main body so that a lower portion of the insert extends beyond a termination of the main body.

13. A retrieving device according to claim 1 wherein the insert comprises nylon and the main body comprises brass.

14. A retrieving device according to claim 1 wherein the main body has a narrowed portion intermediate an upper wider portion and a lower lip portion to which the chains are attached.

15. A retrieving device for connection to a retrieving line for retrieving a snagged fishing lure connected to a snagged line, comprising:

a weighted main body having a longitudinal aperture which receives an insert also having an aperture;

both the main body and the insert each having a slit;

the slit being positioned in the insert such that the slit may be aligned with the main body slit so as to permit the snagged line to be positioned from a location external to the retrieval device to an internal position within the aperture of the insert, and such that when a position of the insert is changed and the slits are no longer aligned, the snagged line will be retained within the insert aperture and the main body will guide itself downwardly along the snagged line;

attachment means for attaching the retrieving line to the main body;

a plurality of chains being suspended from a bottom portion of the main body and being positioned and dimensioned such that one or more apertures of the chains can engage hooks of the lure when the retrieval device is lowered to a vicinity of the snagged lure; and the attachment means comprising a spring clip having one end adapted for tying to the retrieving line and the other end having mounting portions freely received in mounting apertures of the main body, the mounting apertures, the clip, and the clip mounting portions being dimensioned and positioned such that with the insert received within the main body, the insert blocks disengagement of the clip mounting portions from said mounting apertures.

* * * * *